J. C. McLACHLAN AND J. RUCKSTINAT.
TRACTOR.
APPLICATION FILED FEB. 26, 1918.

1,325,366.

Patented Dec. 16, 1919.
4 SHEETS—SHEET 1.

Inventors.
J. C. McLachlan
J. Ruckstinat
by H. J. S. Dennison
atty

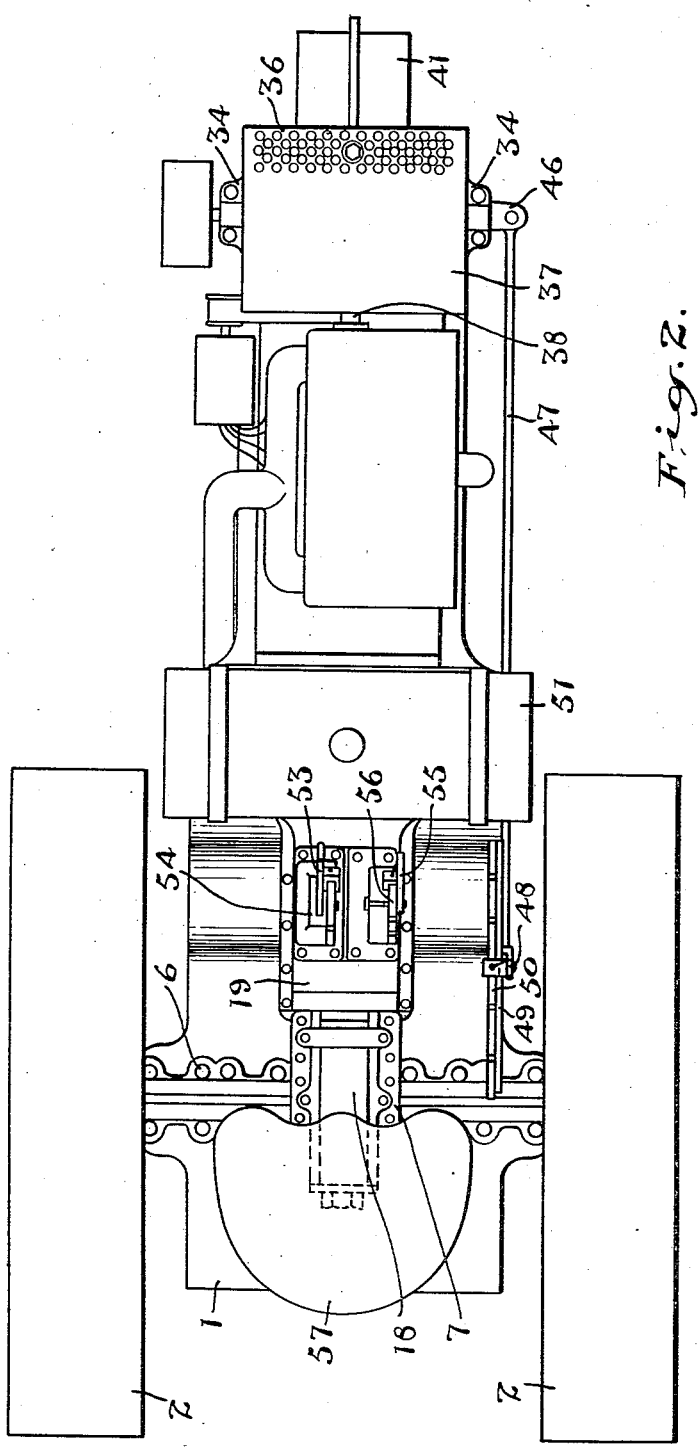

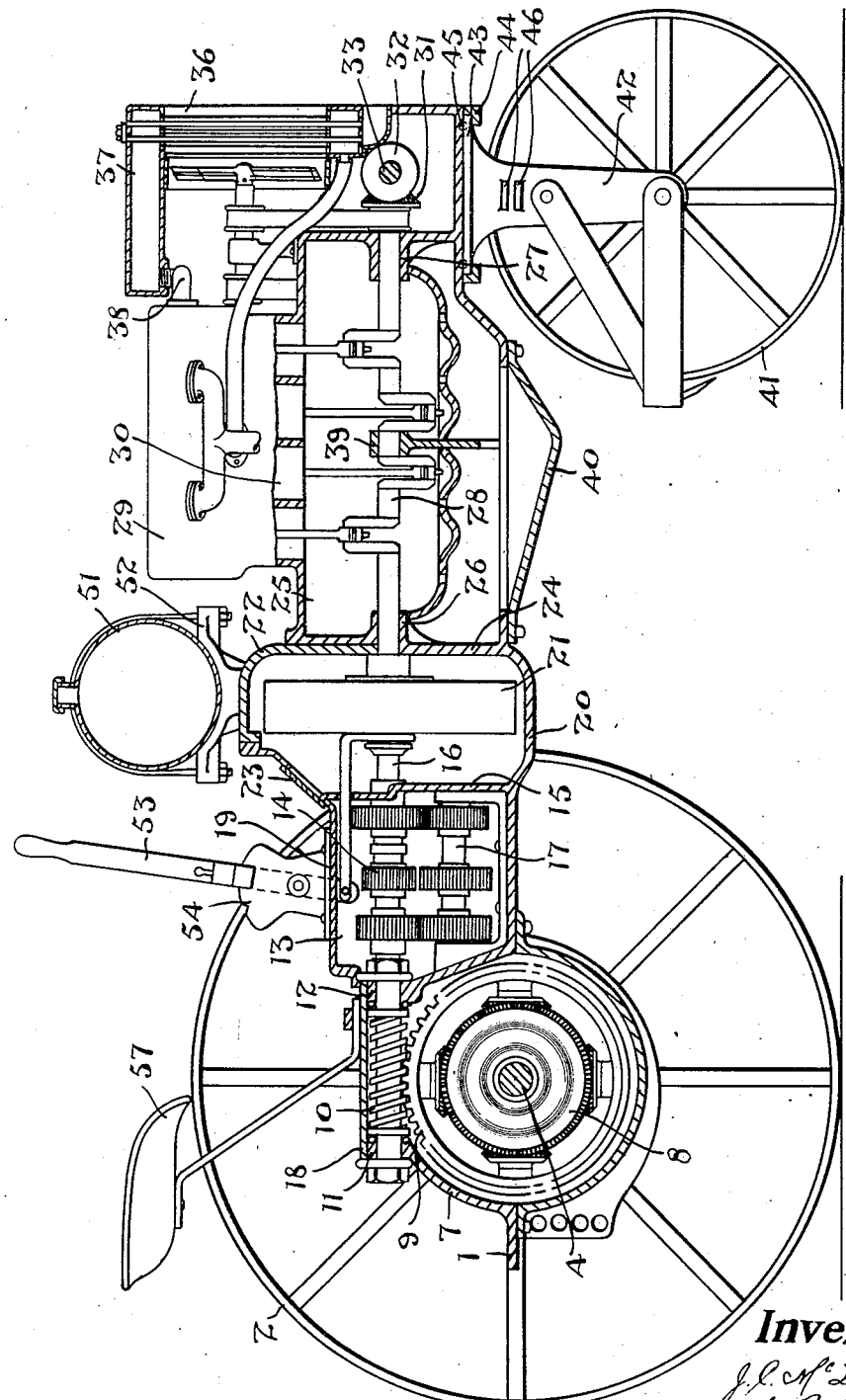

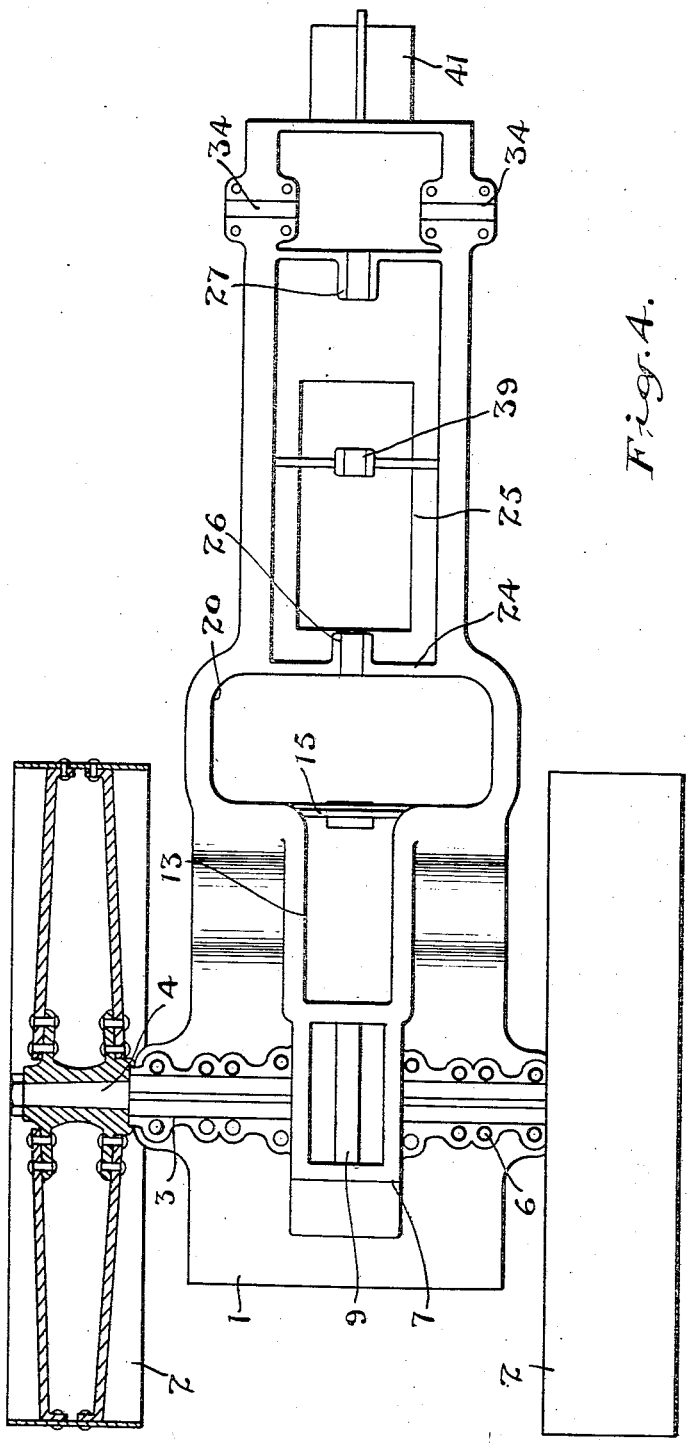

UNITED STATES PATENT OFFICE.

JOHN C. McLACHLAN AND JOHANNES RUCKSTINAT, OF TORONTO, ONTARIO, CANADA.

TRACTOR.

1,325,366.

Specification of Letters Patent.

Patented Dec. 16, 1919.

Application filed February 26, 1918. Serial No. 219,183.

*To all whom it may concern:*

Be it known that we, JOHN CAMPBELL MCLACHLAN and JOHANNES RUCKSTINAT, both subjects of the King of Great Britain, and residents of the city of Toronto, county of York, Province of Ontario, in the Dominion of Canada, have invented certain new and useful Improvements in Tractors, described in the following specification and illustrated in the accompanying drawings, that form part of the same.

The objects of the invention are, to devise a tractor which will be very rigid in its construction and compact in form, may be easily handled in all classes of work and will not be liable to get out of order.

A further and very important object is to so construct a machine as to have the power transmission entirely inclosed and free from detrimental effect of external conditions with which machines of this class are constantly brought into contact.

The principal feature of the invention consists in the novel construction and arrangement of parts, whereby the main frame is formed of a unitary metal casting which supports the entire power unit and transmission and carries the traction and supporting wheels.

In the accompanying drawings, Figure 1 is a side elevational view of the machine.

Fig. 2 is a plan view.

Fig. 3 is a longitudinal vertical mid-sectional view.

Fig. 4 is a plan view of the main frame and supporting wheels.

Like numerals of reference indicate corresponding parts in each figure.

Figure 1:
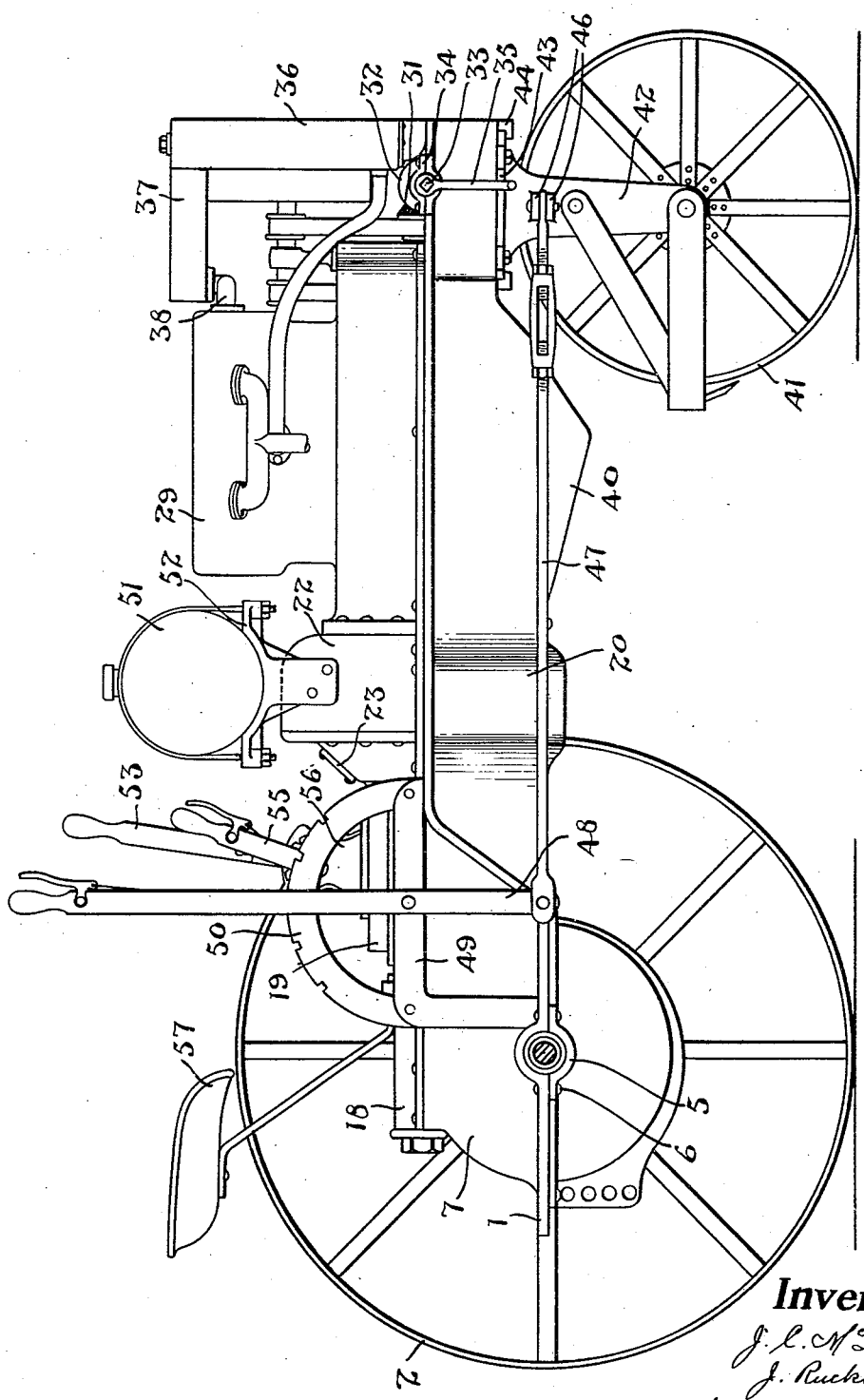

Referring to the accompanying drawings, the main frame 1 is formed of a single metal casting which at the rear end extends the full width of the machine between the drive wheels 2 and is formed with transverse bearings 3 in which the axle 4 is journaled, the frame resting upon the axle and the axle being secured in place by the under cap 5 which is suitably secured to the underside of the main frame by the bolts 6.

The frame 1 is formed with a raised portion 7 centrally of its width over the axle bearing 2 which forms the upper part of the housing for the differential gear 8 which is here shown as having the crown gear 9 in the form of a worm wheel.

A worm 10 is journaled in the bearings 11 and 12 in the upper part of the portion 7 of the frame. The side walls of the raised center 7 are carried forward beyond the differential housing and form the side walls of the gear box 13 in which the change gears 14 are arranged.

A transverse partition wall 15 closes the forward end of the gear box and supports the bearings for the main shaft 16 and jack shaft 17.

The worm casing and gear box are closed at the top by the caps 18 and 19 respectively. The side walls of the gear box 13 are continued in an outward direction to form the clutch housing 20 in which the engine fly wheel 21 and a suitable clutch are arranged. The upper portion of the housing 20 is formed by a cap 22 which is preferably provided with a removable hand cover 23 which allows of easy inspection and adjustment of the clutch.

The forward wall 24 of the clutch housing is formed as an integral part with the frame 1 and the side walls are continued forwardly to form the engine base and crank case 25 having the bearings 26 and 27 supporting the engine crank shaft 28.

The engine frame 29 carrying the cylinders 30 rests upon the top flanges of the engine base 25 and the engine is thus rigidly secured to the frame of the machine which is a unitary casting from end to end. The frame extends forwardly beyond the engine base providing accommodation for the means for driving the magneto, pumps, fan, etc.

The crank shaft is preferably provided with a beveled gear 31 meshing with the gear 32 which is secured to a shaft 33 supported transversely of the machine in the bearings 34 formed in the side walls of the frame.

A suitable starting crank 35 is secured to one end of the transverse shaft which allows the operator to stand beside the machine when starting and therefore greatly facilitates the starting of the engine in the event of adjustment being required. This cross shaft is also utilized as a power transmitter for utilizing the power of the engine while the tractor is at rest having a pulley arranged on the end opposite to the crank.

The radiator 36 is supported on the forward end of the frame and is here shown of the vertical tubular type having the upper water head 37 extending rearwardly and directly connected to the engine cooling circulation pipe 38.

The engine crank shaft is supported intermediate of its length in the bearing 39 carried on a transverse web forming part of the rigid frame. The bottom of the engine crank case is preferably formed with a removable cover 40 which cover is of dished formation to insure a proper supply of oil being carried to the various parts of the machine by the pump under all possible conditions of grade upon which the machine may be operating.

The forward end of the machine is supported upon the single wheel 41 which is carried in the yoke 42. This yoke 42 is formed with a flat plate member 43 at the top held in position by the ring flange 44 and supporting the weight of the frame upon the ball bearings 45.

A laterally extending pair of arms 46 are pivotally connected to an adjustable rod 47 and the opposite end of this rod is connected to the lower end of the steering lever 48 which lever is pivoted to a bracket 49 and adapted to be held in fixed positions by a suitable bolt carried thereon engaging the notched quadrant 50. The steering of the machine is thus effected by the straight throw of the lever and is very quick and simple in its operation.

A fuel supply tank 51 is supported upon brackets 52 preferably secured to the cap 22 of the clutch housing as being a convenient location. The clutch is operated by a hand lever 53 supported upon a bracket 54 secured to the top of the gear box cap 19, the lower end of the lever extending through a slot in the top of the gear box. The change gears are operated by a lever 55 carried on a quadrant bracket 56 also arranged on top of the gear box.

A seat 57 is supported from the top of the worm gear cap in such a position that the driver is accommodated in a comfortable position within easy reach of the various levers.

It will be seen that a machine constructed as described is very rigid being formed in a unitary casting extending from end to end and the driving shaft is carried direct from the engine bearings to the differential and is supported in positively alined bearings which are not subject to any relative racking influence on account of being contained within the solid cast frame.

The construction of the device is extremely simple and the machine work required is reduced to the minimum. The engine cylinders are supported directly from the main frame of the machine, consequently a great saving in material and weight is effected. All the parts are easily accessible and the whole arrangement constitutes a very compact and simple form of tractor.

What we claim as our invention is:—

1. A tractor, comprising a unitary casting having a longitudinal depression in the forward end forming the engine crank case, the side walls extending rearwardly and forming pockets for the clutch and change gears, integral transverse walls dividing the engine crank case, clutch case and gear case, a transverse bearing formed at the rear end of said casting, a driving axle journaled in said bearing, and a drive shaft extending longitudinally of said casting and journaled in said division walls.

2. A tractor, comprising, a unitary casting having perpendicular side walls and transverse division walls integral therewith forming pockets in the casting, the forward pocket comprising the engine crank case and the succeeding pockets forming clutch and gear cases, the rear end having a transverse bearing on the under side, an axle supporting said casting, a cap holding said axle in place, and a longitudinally journaled shaft operating said axle.

J. C. McLACHLAN.
J. RUCKSTINAT.